US008311817B2

(12) United States Patent
Murgia et al.

(10) Patent No.: US 8,311,817 B2
(45) Date of Patent: Nov. 13, 2012

(54) SYSTEMS AND METHODS FOR ENHANCING VOICE QUALITY IN MOBILE DEVICE

(75) Inventors: Carlo Murgia, Sunnyvale, CA (US); Scott Isabelle, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/288,858

(22) Filed: Nov. 3, 2011

(65) Prior Publication Data

US 2012/0116758 A1 May 10, 2012

Related U.S. Application Data

(60) Provisional application No. 61/410,323, filed on Nov. 4, 2010.

(51) Int. Cl.

*G10L 21/02* (2006.01)
*G10L 15/20* (2006.01)
*G10L 21/00* (2006.01)
*G10L 19/00* (2006.01)

(52) U.S. Cl. ..................... 704/227; 704/233; 704/270.1; 704/500

(58) Field of Classification Search ........................ None
See application file for complete search history.

(56) References Cited

U.S. PATENT DOCUMENTS

| | | | | |
|---|---|---|---|---|
| 5,974,379 | A * | 10/1999 | Hatanaka et al. | 704/225 |
| 6,104,993 | A * | 8/2000 | Ashley | 704/227 |
| 6,240,386 | B1 * | 5/2001 | Thyssen et al. | 704/220 |
| 6,490,556 | B1 * | 12/2002 | Graumann et al. | 704/233 |
| 6,810,273 | B1 * | 10/2004 | Mattila et al. | 455/570 |
| 7,054,809 | B1 * | 5/2006 | Gao | 704/229 |
| 7,283,956 | B2 * | 10/2007 | Ashley et al. | 704/228 |
| 7,472,059 | B2 * | 12/2008 | Huang | 704/220 |
| 7,657,427 | B2 * | 2/2010 | Jelinek | 704/208 |
| 8,032,369 | B2 * | 10/2011 | Manjunath et al. | 704/229 |
| 8,060,363 | B2 * | 11/2011 | Ramo et al. | 704/227 |
| 2001/0041976 | A1 * | 11/2001 | Taniguchi et al. | 704/226 |
| 2007/0038440 | A1 * | 2/2007 | Sung et al. | 704/218 |
| 2008/0208575 | A1 * | 8/2008 | Laaksonen et al. | 704/225 |
| 2009/0287481 | A1 * | 11/2009 | Paranjpe et al. | 704/226 |
| 2011/0184732 | A1 * | 7/2011 | Godavarti | 704/207 |

OTHER PUBLICATIONS

Cisco, "Understanding How Digital T1 CAS (Robbed Bit Signaling) Works in IOS Gateways", available at: http://www.cisco.com/image/gif/paws/22444/t1-cas-ios.pdf, Jan. 17, 2007.*

3GPP2 "Enhanced Variable Rate Codec, Speech Service Options 3, 68, 70, and 73 for Wideband Spread Spectrum Digital Systems", May 2009, pp. 1-308.

(Continued)

*Primary Examiner* — Brian Albertalli

(74) *Attorney, Agent, or Firm* — Carr & Ferrell LLP

(57) ABSTRACT

Provided are methods and systems for enhancing the quality of voice communications. The method and corresponding system may involve classifying an audio signal into speech, and speech and noise and creating speech-noise classification data. The method may further involve sharing the speech-noise classification data with a speech encoder via a shared memory or by a Least Significant Bit (LSB) of a Pulse Code Modulation (PCM) stream. The method and corresponding system may also involve sharing acoustic cues with the speech encoder to improve the speech noise classification and, in certain embodiments, sharing scaling transition factors with the speech encoder to enable the speech encoder to gradually change data rate in the transitions between the encoding modes.

28 Claims, 7 Drawing Sheets

OTHER PUBLICATIONS

3GPP2 "Selectable Mode Vocoder (SMV) Service Option for Wideband Spread Spectrum Communication Systems", Jan. 2004, pp. 1-231.

3GPP2 "Source-Controlled Variable-Rate Multimode Wideband Speech Codec (VMR-WB) Service Option 62 for Spread Spectrum Systems", Jun. 11, 2004, pp. 1-164.

3GPP "3GPP Specification 26.071 Mandatory Speech CODEC Speech Processing Functions; AMR Speech Codec; General Description", http://www.3gpp.org/ftp/Specs/html-info/26071.htm, accessed on Jan. 25, 2012.

3GPP "3GPP Specification 26.094 Mandatory Speech Codec Speech Processing Functions; Adaptive Multi-Rate (AMR) Speech Codec; Voice Activity Detector (VAD)", http://www.3gpp.org/ftp/Specs/html-info/26094.htm, accessed on Jan. 25, 2012.

3GPP "3GPP Specification 26.171 Speech Codec Speech Processing Functions; Adaptive Multi-Rate—Wideband (AMR-WB) Speech Codec; General Description", http://www.3gpp.org/ftp/Specs/html-info26171.htm, accessed on Jan. 25, 2012.

3GPP "3GPP Specification 26.194 Speech Codec Speech Processing Functions; Adaptive Multi-Rate—Wideband (AMR-WB) Speech Codec; Voice Activity Detector (VAD)" http://www.3gpp.org/ftp/Specs/html-info26194.htm, accessed on Jan. 25, 2012.

International Telecommunication Union "Coding of Speech at 8 kbit/s Using Conjugate-Structure Algebraic-code-excited Linear-prediction (CS-ACELP)", Mar. 19, 1996, pp. 1-39.

International Telecommunication Union "Coding of Speech at 8 kbit/s Using Conjugate Structure Algebraic-code-excited Linear-prediction (CS-ACELP) Annex B: A Silence Compression Scheme for G.729 Optimized for Terminals Conforming to Recommendation V.70", Nov. 8, 1996, pp. 1-23.

* cited by examiner

SYSTEMS AND METHODS FOR ENHANCING VOICE QUALITY IN MOBILE DEVICE

CROSS REFERENCES TO RELATED APPLICATIONS

This nonprovisional patent application claims priority benefit of U.S. Provisional Patent Application No. 61/410,323, filed Nov. 4, 2010, titled: "Improved Voice Quality in Mobile Device," which is hereby incorporated by reference in its entirety.

TECHNICAL FIELD

The application generally relates to speech communication devices, and more specifically, to improving audio quality in speech communications.

BACKGROUND

A speech encoder is typically used to process noisy speech and tested using a moderate level of noise. Since substantial background noises are common in speech communications, the speech encoder may include its own "native" noise suppressor to attempt to suppress these background noises before the speech is encoded by a speech encoder. The speech encoder's noise suppressor may simply classify audio signals as stationary and non-stationary, (i.e., the stationary signal corresponding to noise and the non-stationary signal corresponding to speech). In addition, the speech encoder's noise suppressor is typically monaural, further limiting the classification effectiveness of the noise suppressor.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one example, a method for improving quality of speech communications may involve receiving an audio signal, classifying the audio signal into speech, and speech and noise, creating speech-noise classification data based on the classification, and providing the speech-noise classification data for use by a speech encoder, the speech encoder being configured to encode the audio signal into one or more data rate modes based on the speech-noise classification data.

In one example, a method for improving quality of speech communications may involve receiving an audio signal, classifying the audio signal into speech, and speech and noise, and providing one or more scaling transition factors for use by a speech encoder, the speech encoder being configured to use the one or more scaling transition factors to gradually change a data rate in transitions between one or more encoding modes based on the classification.

In one embodiment, a system for improving quality of speech communications may include a communication module of a noise suppressor to receive an audio signal, and a classification module of the noise suppressor to classify the audio signal into speech, and speech and noise, wherein a speech encoder is configured to encode the audio signal into one or more data rate modes based on the classification.

In further embodiments, a system for improving quality of speech communications includes a communication module of a noise suppressor to receive an audio signal and a classification module of the noise suppressor to classify the audio signal into one or more speech, and speech and noise signals, the communication module being configured to provide one or more scaling transition factors for use by a speech encoder based on the classifications and the speech encoder being configured to use the one or more scaling transition factors to gradually change data rate in transitions between one or more encoding modes.

Thus, various embodiments may improve voice quality by incorporating one or more features. The features may include improved noise suppression over different frequencies, noise suppression smoothing, and the like. Some embodiments may include changes and improvements to speech classification accuracy and various voice encoder configurations.

Embodiments described herein may be practiced on any device that is configured to receive and/or provide audio such as, but not limited to, personal computers, tablet computers, mobile devices, cellular phones, phone handsets, headsets, and systems for teleconferencing applications.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
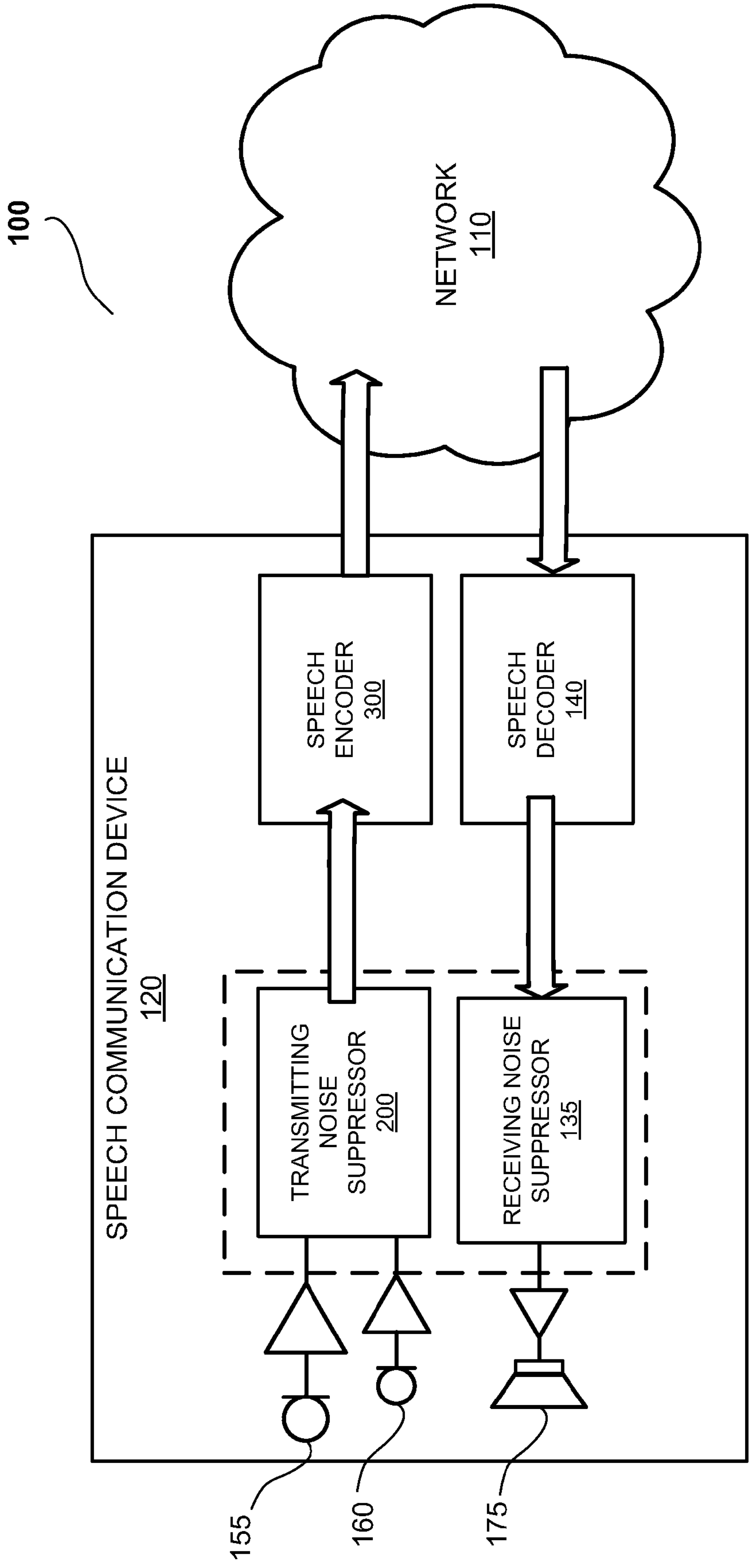
FIG. 1 is a block diagram of an example communication device environment.

Various aspects of the subject matter disclosed herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects may be practiced without these specific details. In other instances, well-known structures and devices are shown in block diagram form in order to facilitate describing one or more aspects.

The following publications are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

EVRC (Service Option 3), EVRC-B (Service Option 68), EVRC-WB (Service Option 70), EVRC-NW (Service Option 73): 3GPP2 C.S0014-D; SMV (Service Option 30): 3GPP2 C.S0030-0 v3.0; VMR-WB (Service Option 62): 3GPP2 C.S0052-0 V1.0; AMR: 3GPP TS 26.071; AMR VAD: 3GPP TS 26.094; WB-AMR: 3GPP2 TS 26.171; WB-AMR VAD: 3GPP2 TS 26.194; G.729: ITU-T G.729; G.729 VAD: ITU-T G.729b.

Speech encoding involves compression of audio signals containing speech. Speech encoding may use speech-specific parameter estimation based on audio signal processing techniques to model speech signals. These techniques may be combined with generic data compression algorithms to represent the resulting modeled parameters in a compact data stream. Speech coding is widely used in mobile telephony and Voice over Internet Protocol (VoIP).

Because the quality of speech coding may be affected by background noises, a noise suppressor may be used to improve the quality of speech communications. Some speech encoders may include their own "native" noise suppressor as well as a Voice Activity Detector (VAD). The VAD may be used to determine whether the audio signal is speech, speech mixed with noise, or just noise. However, existing speech encoder's noise suppressors are very rudimentary, take very conservative approaches to classification of audio signals, and are therefore identified herein as being of "low quality." Therefore, a high quality noise suppressor, different than any noise suppression provided by the speech encoder, may be used to improve the quality of audio signals. The high quality noise suppressor may be more effective in suppressing noises than the native noise suppressor because, among other things, the external high quality noise suppressor utilizes an extra microphone, so its classification is intrinsically better than the classification provided by monaural encoder. (An exemplary high quality noise suppressor is described in U.S. patent application Ser. No. 11/343,524, which is hereby incorporated by reference in its entirety.) However, when an external high quality noise suppressor is coupled to a speech encoder, the high quality noise suppressor may create spectral characteristics that lead to misinterpretations of the audio by the speech encoder. For example, a noise signal coming from the high quality noise suppressor can be so clean that the encoder may misinterpret it as speech and proceed with encoding this signal at a higher data rate typically reserved for speech signals. Similarly, a speech signal may be misunderstood as noise and encoded at a lower data rate, thereby creating choppy speech sound. These issues may occur regardless of presence of the speech encoder's own native noise suppressor.

In some embodiments, instead of merely providing the speech encoder with a clean audio signal and leaving it to the speech encoder to classify the audio signal, an external high quality noise suppressor provides its classification of the audio signal for use by the speech encoder. The external high quality noise suppressor may share with the speech encoder or otherwise make available to the speech encoder the classification of the audio signal. Additionally or alternatively, the high quality noise suppressor may provide data for use by the encoder so that the encoder can make its own classifications based on the (shared) data. Different classifications may be made for speech, speech or noise, or just noise. Additionally, the high quality noise suppressor may share specific acoustic cues with the speech encoder, which may be used to encode various audio signals in different data rates. Additionally or alternatively, the high quality noise suppressor may share predetermined specifications based on these acoustic cues. These specifications may divide the audio signal into a plurality of audio types ranging, for example, from a mere white noise to a high pitch speech.

The classification data provided by the high quality noise suppressor may be shared with the speech encoder via a common memory, or exchanged directly (e.g., via the LSB of a PCM stream). The LSB of a PCM stream may be used, for instance, when the high quality noise suppressor and encoder do not share a memory. In some embodiments, where the high quality noise suppressor and encoder are located on different chips that may or may not have access to a common memory, the classification data from the high quality noise suppressor may assist the encoder to more properly classify the audio signal, and, based on the classification, determine an appropriate data rate for the particular type of the outgoing audio signal.

Typically, a speech encoder encodes less important audio signals with a lesser quality low rate (e.g., Quarter Rate in CDMA2000 codecs, such as EVRC-B SMV etc.), while more important data is encoded with a higher quality data rate (e.g., Full Code Excited Linear Prediction). However, an encoder may misclassify the audio signal received from the high quality noise suppressor because such audio signal has a better signal to noise ratio than the one for which the speech encoder was designed and tested. To avoid artifacts, such as large changes in the decoded signal resulting from differences among coding schemes to accurately reproduce the input signal energy, a scaling factor may be provided to scale the signal in the transition areas. The resultant smoothing of energy transitions improves the quality of the encoded audio. The speech encoder may be a variable bit encoder that includes a rate determining module 315. The classification information may also be used to allow adjusting the parameters of the rate determining module 315 to smooth the audio in transition between different data rates.

In some example embodiments, the bandwidth saved by lowering the data rate of noise may be used to further improve the quality of the speech signal. Additionally or alternatively, this spare bandwidth may be used to improve channel quality to compensate for poor channel quality, for example, by allocating the bandwidth to a channel encoding which may recover data loss during the transmission in the poor quality channel. The spare bandwidth may also be used to improve channel capacity.

FIG. 1 is a block diagram of an example communication device environment 100. As shown, the environment 100 may include a network 110 and a speech communication device 120. The network 110 may include a collection of terminals, links and nodes, which connect together to enable telecommunication between the speech communication device 120 and other devices. Examples of network 110 include the Internet, which carries a vast range of information resources and services, including various Voice over Internet Protocol (VoIP) applications providing for voice communications over the Internet. Other examples of the network 110 include a telephone network used for telephone calls and a wireless network, where the telephones are mobile and can move around anywhere within the coverage area.

The speech communication device 120 may include a mobile telephone, a smartphone, a Personal Computer (PC), a tablet computer, or any other devices that support voice communications. The speech communication device 120 may include a transmitting noise suppressor (also referred to herein as a high quality noise suppressor) 200, a receiving noise suppressor 135, a speech encoder 300, a speech decoder 140, a primary microphone 155, a secondary microphone 160 (optional), and an output device (e.g., a loudspeaker) 175. The speech encoder 300 and the speech decoder 140 may be standalone components or integrated into a speech codec, which may encode and/or decode a digital data stream or signal. The speech decoder 140 may decode encoded digital signal for playback via an output device 175. Optionally, the digital signal decoded by the speech decoder 140 may be "cleaned" by the receiving noise suppressor 135 before being transmitted to the output device 175.

The speech encoder 300 may encode digital audio signals containing speech received from the primary microphone 155 and, optionally, from the secondary microphone 160 either directly or via the transmitting noise suppressor 200. The speech encoder 300 may be using speech-specific parameter estimation which uses audio signal processing techniques to model the speech signal, combined with generic data compression algorithms to represent the resulting modeled parameters in a compact data stream. Some examples of applications of speech encoding include mobile telephony and Voice over IP.

Figure 2:
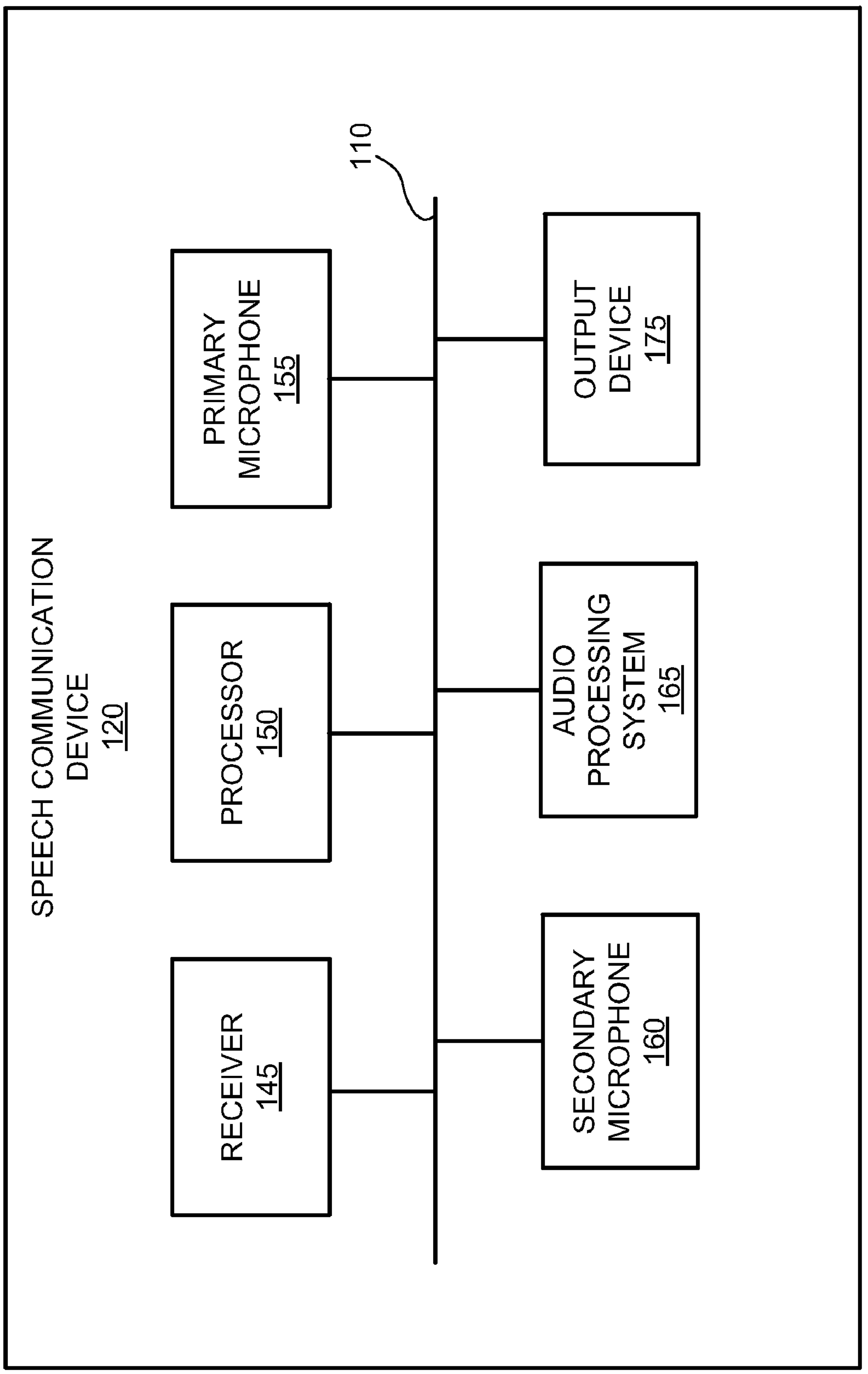
FIG. 2 is a block diagram of an example communication device implementing various embodiments described herein.

FIG. 2 is a block diagram of the example speech communication device 120 implementing embodiments. The speech communication device 120 is an audio receiving and transmitting device that include a receiver 145, a processor 150, the primary microphone 155, the secondary microphone 160, an audio processing system 165, and the output device 175. The speech communication device 120 may include other components necessary for speech communication device 120 operations. Similarly, the speech communication device 120 may include fewer components that perform similar or equivalent functions to those depicted in FIG. 2.

The processor 150 may include hardware and software which implements the noise suppressor 200 and/or the speech encoder 300 described above with reference to FIG. 1.

The example receiver 145 may be an acoustic sensor configured to receive a signal from a communication network, for example, the network 110. In some example embodiments, the receiver 145 may include an antenna device. The signal may then be forwarded to the audio processing system 165 and then to the output device 175. For example, the audio processing system 165 may include various features for performing operations described in this document. The features described herein may be used in both transmit and receive paths of the speech communication device 120.

The audio processing system 165 may be configured to receive the acoustic signals from an acoustic source via the primary and secondary microphones 155 and 160 (e.g., primary and secondary acoustic sensors) and process the acoustic signals. The primary and secondary microphones 155 and 160 may be spaced a distance apart in order to achieve some energy level difference between the two. After reception by the microphones 155 and 160, the acoustic signals may be converted into electric signals (i.e., a primary electric signal and a secondary electric signal). The electric signals may themselves be converted by an analog-to-digital converter (not shown) into digital signals for processing, in accordance with some embodiments. In order to differentiate the acoustic signals, the acoustic signal received by the primary microphone 155 is herein referred to as the "primary acoustic signal," while the acoustic signal received by the secondary microphone 160 is herein referred to as the "secondary acoustic signal." It should be noted that embodiments may be practiced utilizing any number of microphones. In example embodiments, the acoustic signals from output device 175 may be included as part of the (primary or secondary) acoustic signal. The primary acoustic signal and the secondary acoustic signal may be processed by audio processing system 165 to produce a signal with an improved signal to noise ratio for transmission across a communications network and/or routing to the output device.

The output device 175 may be any device which provides an audio output to a listener (e.g., an acoustic source). For example, the output device 175 may include a speaker, an earpiece of a headset, or handset on the speech communication device 120.

In various embodiments, where the primary and secondary microphones are omni-directional microphones that are closely-spaced (e.g., 1-2 cm apart), a beam-forming technique may be used to simulate forward-facing and backward-facing directional microphone responses. (An exemplary system and method for utilizing omni-directional microphones for speech enhancement is described in U.S. patent application Ser. No. 11/699,732, which is hereby incorporated by reference in its entirety.) A level difference may be obtained using the simulated forwards-facing and backwards-facing directional microphones. The level difference may be used to discriminate speech and noise in, for example, the time-frequency domain, which can be used in noise and/or echo reduction/suppression. (Exemplary multi-microphone robust noise suppression, and systems and methods for utilizing inter-microphone level differences for speech enhancement are described U.S. patent application Ser. Nos. 12/832,920 and 11/343,524, respectively, which are hereby incorporated by reference in their entirety.)

Various embodiments may be practiced on any device that is configured to receive and/or provide audio and has processing capabilities such as, but not limited to, cellular phones, phone handsets, headsets, and systems for teleconferencing applications.

Figure 3:
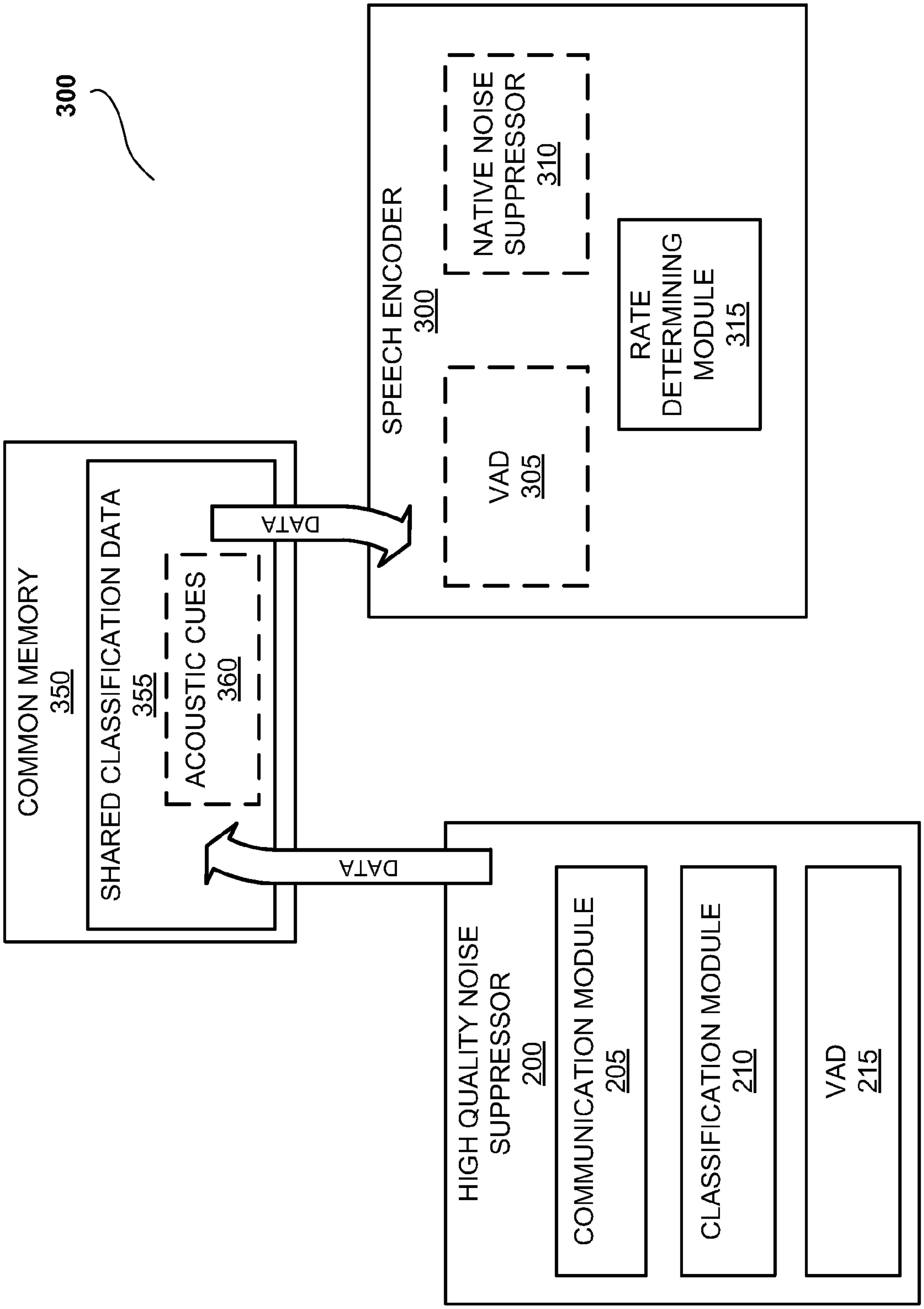
FIG. 3 is a block diagram illustrating sharing classification data via a common memory.

FIG. 3 is a block diagram illustrating sharing classification data via a common memory. The noise suppressor (also referred to herein and identified in FIG. 3 as the high quality noise suppressor) 200 may include a communication module 205 and a classification module 210. The classification module 210 may be capable of accurately separating speech, and speech and noise to eliminate the noise and preserve the speech. In order to do so, the classification module 210 may rely on acoustic cues 360, such as stationarity, direction, inter microphone level difference (ILD), inter microphone time difference (ITD), and other types of acoustic cues. Moreover, the noise suppressor 200 may have an accurate signal to noise ratio estimation and an estimate of the speech damage created by the noise and the noise removal. Therefore, the noise communication module 205 is able to make data related to the classification available to the speech encoder 300 to improve the speech noise classification.

The noise suppressor 200 may include a Voice Activity Detection (VAD) 215, which is also known as speech activity detection or speech detection. VAD techniques are used in speech processing in which the presence or absence of human speech is detected. The speech encoder 300 may also include a native VAD 305. However, the VAD 305 may be inferior to the VAD 215, especially when exposed to different types and levels of noise. Accordingly, the VAD 215 information may be provided to the speech encoder 300 by the noise suppressor 200 with the native VAD 305 of the speech encoder 300 being bypassed.

Further classification of the speech can also be provided by the noise suppressor 200. Specifically, Table 1 presented below illustrates different acoustic cues provided by the noise suppressor 200 and their correspondence to various encoding modes. These acoustic cues can be used to more effectively classify speech frames in groups and maximize the bit-rate saving and/or the voice quality.

TABLE 1

| Noise Suppressor Cues | EVRC-B coding mode |
|---|---|
| High saliency on output | FCELP/PPP |
| VAD = 0 (tuned with % of taps) | QR silence |
| VAD = 1 + low saliency on output | NELP |
| Transient (onset) detection | FCELP |

TABLE 1-continued

| | |
|---|---|
| Pitch stationarity | PPP |
| Envelope stationarity | PPP |

The acoustic cues of Table 1 are described further below.

As the classification of the audio signal is improved, the average bit-rate may be reduced, i.e. less noise frames are misclassified as speech and therefore are coded with a lower bit-rate scheme. This reduction results in power savings, less data to transmit (i.e., saved data), more efficient usage of the Radio Frequency (RF) traffic, and increasing the overall network capacity.

In other example embodiments, the saved data may be used to achieve a target average bit-rate by reassigning the data saved from lower bit-rate encoding of noise frames to speech frames. This way the voice quality will be increased.

When the audio signal is cleaned by a high quality noise suppressor, modification of the signal is introduced. These modifications may sound fine for humans but violate certain assumptions being made during the development of the speech encoder. Therefore, if may be difficult for the speech encoder to make correct classifications when encoding the modified signal.

In general, when the audio signal(s) is first processed by the noise suppressor 200 before sending to the speech encoder 300, the classification is improved because the background noise is reduced and the speech encoder 300 is presented with a better SNR signal. However, the speech encoder 300 may get confused by the residual noise. Thus, in audio data frames that are being clearly classified by the noise suppressor 200 as a noise-only frame, there may be spectral temporal variations that false-trigger the VAD of the speech encoder 300. Consequently, the speech encoder 300 may attempt to encode these noise-only frames using a high bit rate scheme typically reserved for speech frames. This may result in encoding at a higher data rate than is necessary, wasting resources that could be better applied to the encoding of speech.

This wasting of resources may be especially the case for variable bit rate encoding such as, for example, AMR when running in VAD/DTX/CNG mode, Enhanced Variable Rate Codec (EVRC) and EVRC-B, Selectable Mode Vocoder (SMV) (CDMA networks), and the like. The speech encoder 300 may include its own native noise suppressor 310. The native noise suppressor 310 may work by simply classifying audio signal as stationary and non-stationary, i.e., the stationary signal corresponding to noise and the non-stationary signal corresponding to speech and noise. In addition, the native noise suppressor 310 is typically monaural, further limiting its classification effectiveness. The high quality noise suppressor 200 may be more effective in suppressing noises than the native noise suppressor 310 because, among other things, the high quality noise suppressor 200 utilizes an extra microphone, so its classification is intrinsically better than the classification provided by monaural classifier of the encoder. In addition, the high quality noise suppressor 200 may utilize the inter-microphone level differences (ILD) to attenuate noise and enhance speech more effectively, for example, as described in U.S. patent application Ser. No. 11/343,524, incorporated herein by reference in its entirety. When the noise suppressor 200 is implemented in the speech communication device 120, the native noise suppressor 310 of the speech encoder 300 may have to be disabled.

In certain embodiments, the classification information is shared by the noise suppressor 200 with the speech encoder 300. If the noise suppressor 200 and the speech encoder 300 coexist on a chip, they may share a common memory 350.

There may be other ways to share memory between two components of the same chip. Sharing the noise suppression data may result in considerable improvement in the classification of noise, for example, a 50% improvement for total error and false alarms and dramatic improvement for false rejects. This may, for example, result in a 60% saving of energy in the encoding of babble noise with lower SNR but a higher bit rate for speech. Additionally, false rejects typically resulting in speech degradation may be decreased. Thus, for the frames that are classified as noise, a minimum amount of information may be transmitted by the speech encoder and if the noise continues, no transmission may be made by the speech encoder until a voice frame is received.

In the case of variable bit rate encoding schemes (e.g., EVRC, EVRC-B, and SMV), multiple bit rates can be used to encode different type of speech frames or different types of noise frames. For example, two different rates may be used to encode babble noise, such as Quarter Rate (QR) or Noise Excited Linear Prediction (NELP). For noise only, QR may be used. For noise and speech, NELP may be used. Additionally, sounds that have no spectral pitch content (low saliency) sounds like "t", "p", and "s" may use NELP as well. Full Code Excited Linear Prediction (FCELP) can be used to encode frames that are carrying highly informative speech communications, such as transition frames (e.g., onset, offset) as these frames may need to be encoded with higher rates. Some frames carrying steady sounds like the middle of a vowel and may be mere repetitions of the same signal. These frames may be encoded with lower bit rate such as pitch preprocessing (PPP) mode. It should be understood the systems and methods disclosed herein are not limited to these examples of variable encoding schemes.

Table 1 above illustrates how acoustic cues 360 can be used to instruct the speech encoder 300 to use specific encoding codes, in some embodiments. For example, VAD=0 (noise only) the acoustic cues 360 may instruct the speech encoder to use QR. In a transition situation, for example, the acoustic cues 360 may instruct the speech encoder to use FCELP.

Thus, in certain embodiments, the audio frames are preprocessed. The encoder 300 then encodes the audio frames at a certain bit rate(s). Thus, VAD information of the noise suppressor 200 is provided for use by the speech encoder 300, in lieu of information from the VAD 305. Once the decisions made by the VAD 305 of the speech encoder 300 are bypassed, the information provided by the noise suppressor 200 may be used to lower the average bit rate in comparison to the situation where the information is not shared between the noise suppressor 200 and the speech encoder 300. In some embodiments, the saved data may be reassigned to encode the speech frames at a higher rate.

Thus, Table 1 provides an example of acoustic cues that may be available in the noise suppressor 200 and may be shared with the speech encoder 300 to improve voice quality by informing the speech encoder 300 regarding the kind of frame it's about to encode.

Figure 4:
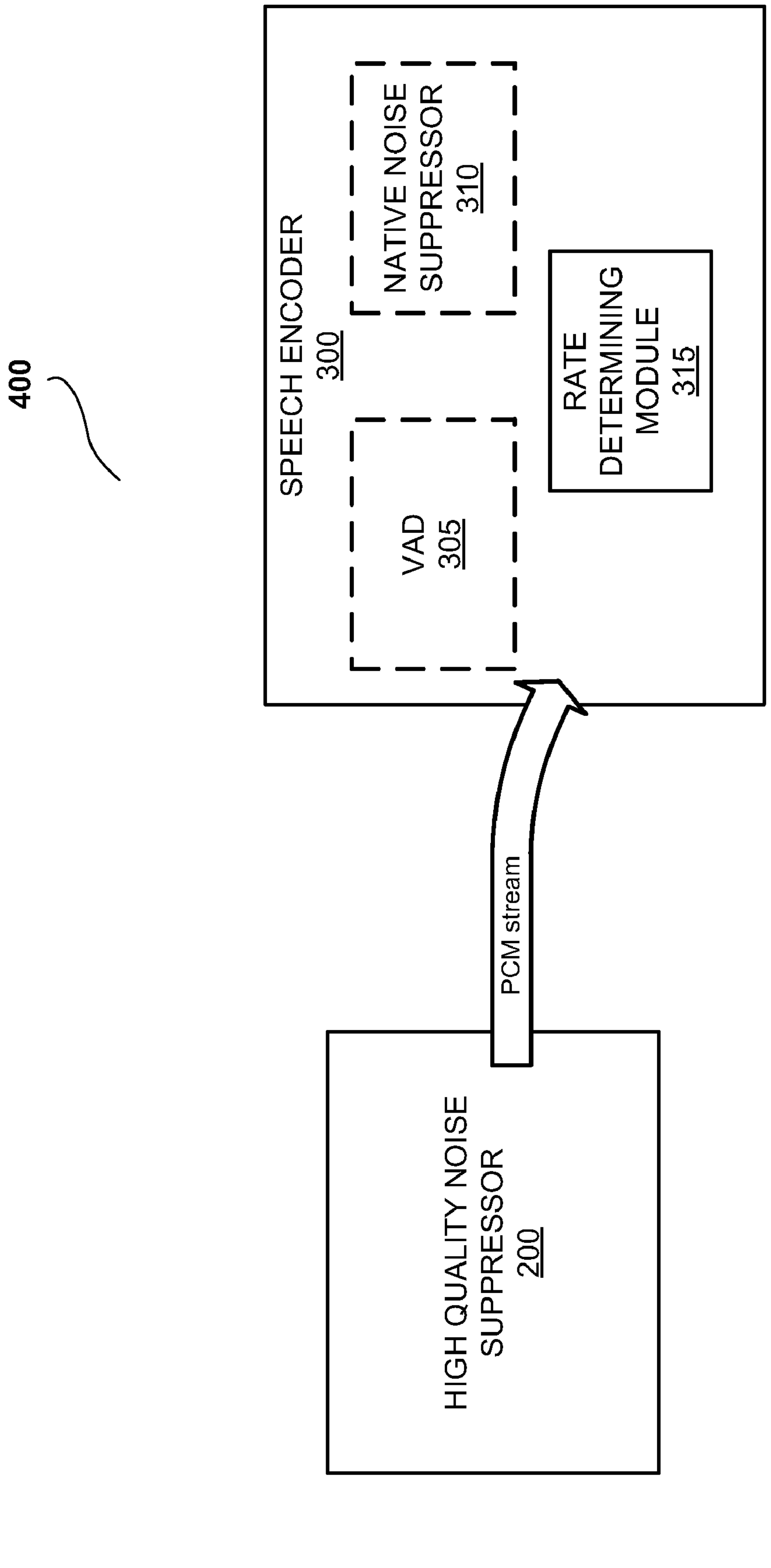
FIG. 4 is a block diagram illustrating sharing classification data via a Least Significant Bit (LSB) of a Pulse Code Modulation (PCM) stream.

FIG. 4 is a block diagram illustrating sharing classification data via a PCM (Pulse Code Modulation) stream. If the noise suppressor 200 and the speech encoder 300 do not share a common memory, an efficient way of sharing information between the two is to embed the classification information in the LSB of the PCM stream. The resulting degradation in audio quality is negligible and the chip performing the speech coding operation can extract the classification from the LSB of the PCM stream or ignore it, if not using this information.

Figure 5:
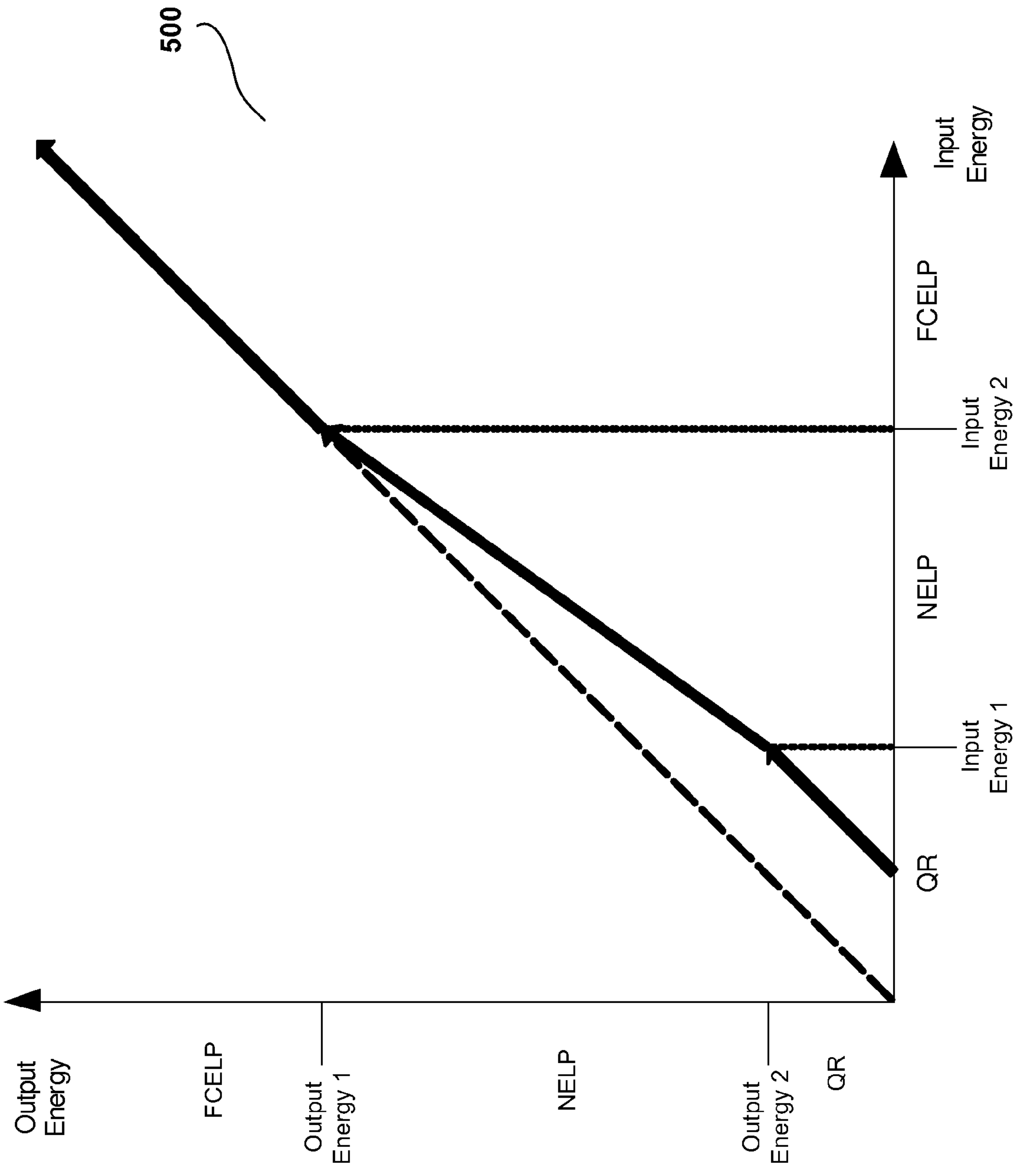
FIG. 5 is a graph illustrating example adjustments to transitions between data rates to avoid audio roughness.

FIG. 5 is a graph 500 illustrating example adjustments to transitions between data rates to avoid audio roughness. In the case of variable bit-rate codecs such as, for example, the CDMA codecs EVRC-B or the SMV, the usage of multiple coding schemes for the background noise may lead to level and spectral discontinuities; an optional signal modification step may be introduced. When the codec decides the frame will be encoded as NELP and the energy level is closer to the level of the frames encoded using the QR coding scheme, then a scaling factor of the signal may be introduced, by this modification the level of the encoded signal may be more uniform and discontinuities are avoided. The scaling factor may be proportional to the level of the input frame so that if the FCELP (Full Code Excited Linear Prediction) is used, the transition NELP to FCELP will also not introduce a discontinuity.

Figure 6:
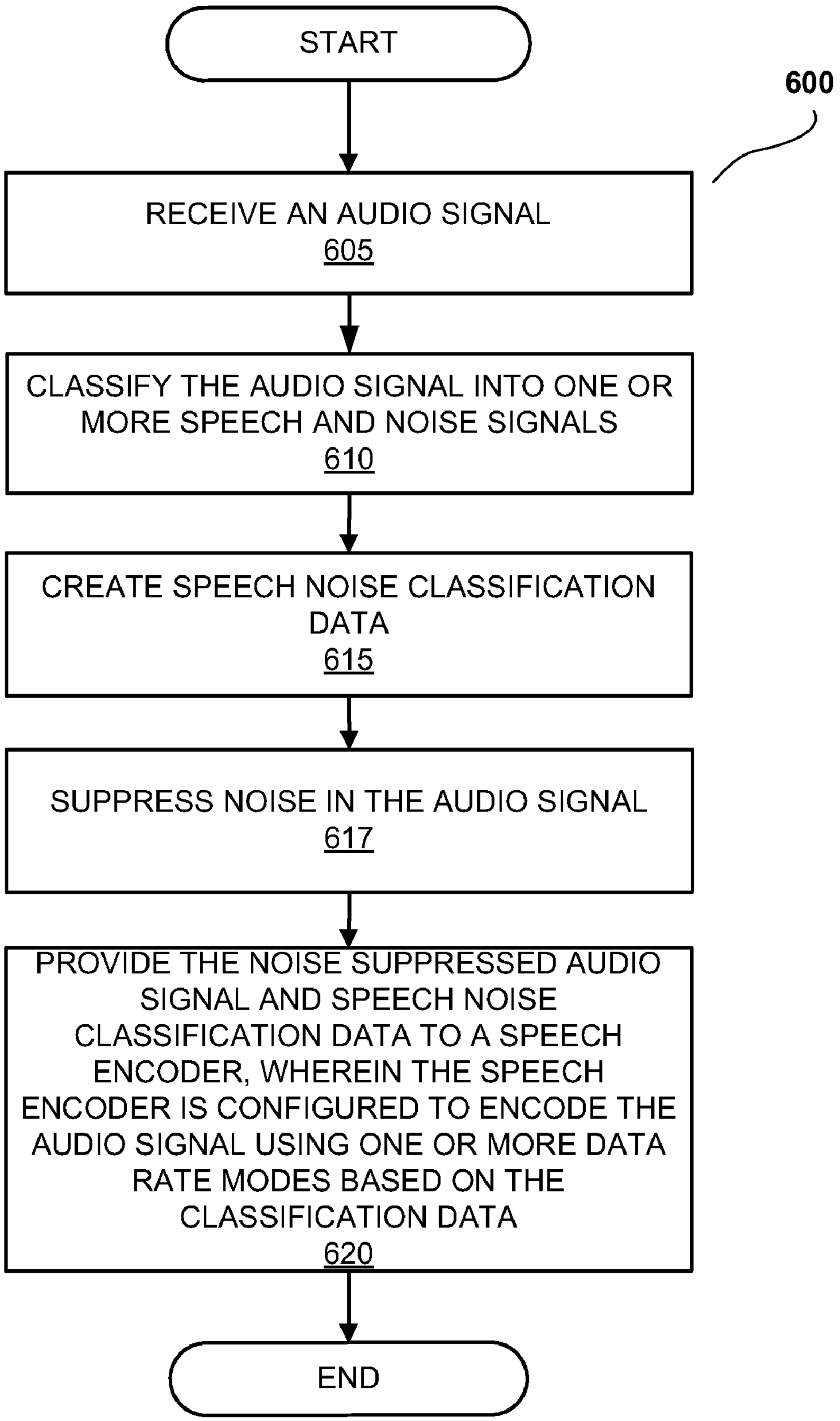
FIGS. 6-7 are flow charts of example methods for improving quality of speech communications.

FIG. 6 is a flow chart of an example method for improving quality of speech communications. The method 600 may be performed by processing logic that may include hardware (e.g., dedicated logic, programmable logic, microcode, etc.), software (such as run on a general-purpose computer system or a dedicated machine), or a combination of both. In one example embodiment, the processing logic resides at the noise suppressor 200.

The method 600 may be performed by the various modules discussed above with reference to FIG. 3. Each of these modules may include processing logic. The method 600 may commence at operation 605 with the communication module 205 receiving an audio signal from an audio source. At operation 610, the classification module 210 may classify the audio signal into speech and noise signals. Based on the classification, at operation 615, the classification module 210 may create speech-noise classification data. At operation 617, a noise suppressor 200 (e.g., high quality noise suppressor) suppresses the noise in the audio signal. At operation 620, the communication module 205 may share the noise suppressed audio signal and speech-noise classification data with a speech encoder 300, wherein the speech encoder 300 may encode the noise suppressed audio signal into one or more data rate modes based on the speech-noise classification data.

Figure 7:
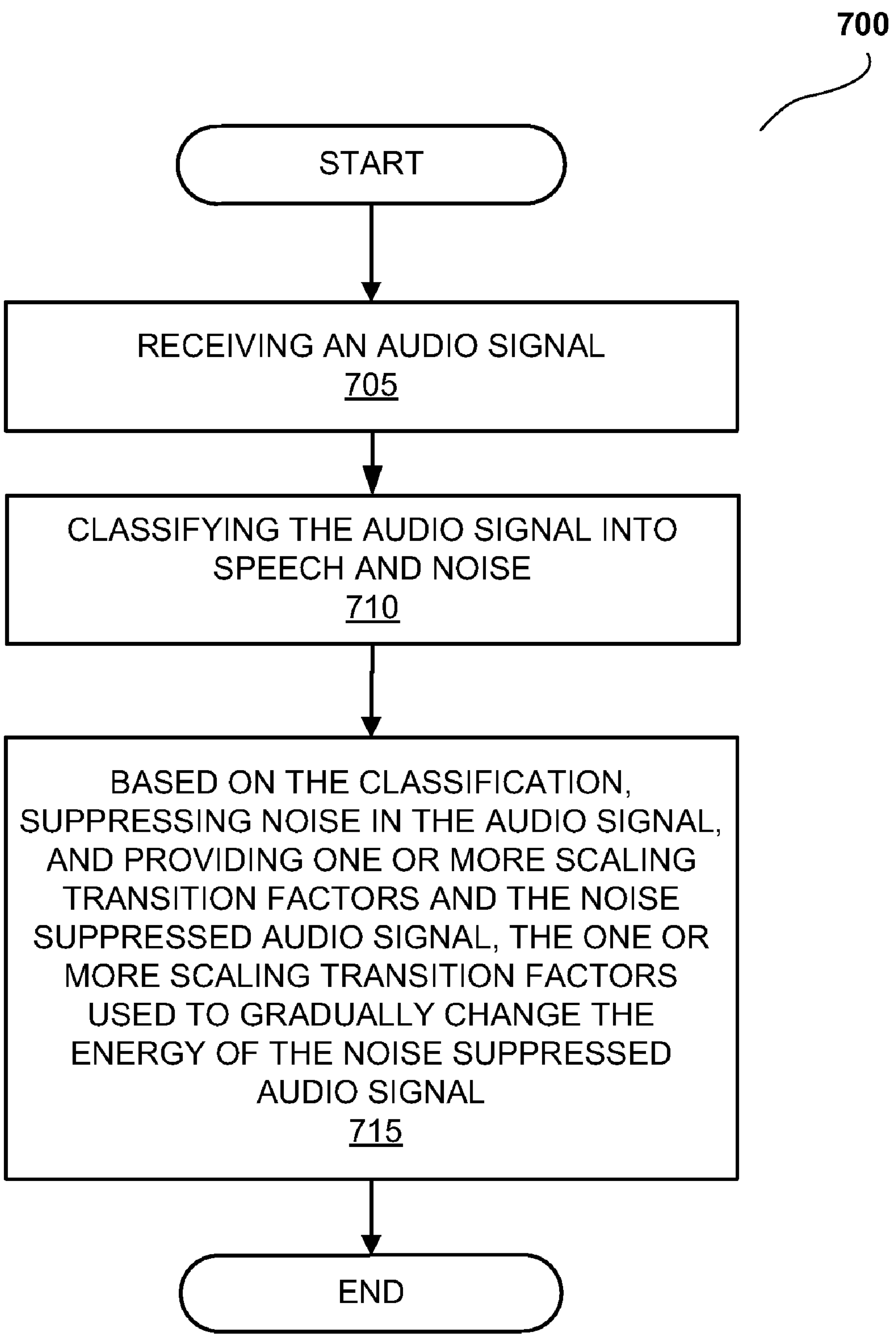

FIG. 7 is a flow chart of an example method for improving quality of speech communications. The method 700 may be performed by processing logic that may include hardware (e.g., dedicated logic, programmable logic, microcode, etc.), software (such as run on a general-purpose computer system or a dedicated machine), or a combination of both. In one example embodiment, the processing logic resides in the noise suppressor 200.

The method 700 may be performed by the various modules discussed above with reference to FIG. 3. Each of these modules may include processing logic. The method 700 may commence at operation 705 with the communication module 205 receiving an audio signal from an audio source. At operation 710, the classification module 210 may classify the audio signal into speech, and speech and noise signals. Based on the classification, at operation 715, the communication module 205 may provide one or more scaling transition factors with a speech encoder 300, the one or more scaling transition factors used to gradually change the energy of the noise suppressed audio signal to be encoded by the encoder. The speech encoder 300 may be configured to use the one or more scaling transition factors to gradually change the signal amplitude (and therefore energy) in transitions between one or more encoding modes.

While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method for improving quality of speech communications, the method comprising:

receiving, by a noise suppressor, an input audio signal;

suppressing, by the noise suppressor, noise in the input audio signal to generate a processed noise-suppressed input audio signal;

classifying, by the noise suppressor, the processed noise-suppressed input audio signal into speech, and speech and noise;

based on the classification, creating, by the noise suppressor, speech-noise classification data; and providing, by the noise suppressor, the speech-noise classification data and the processed noise-suppressed input audio signal for use by a speech encoder, the processed noise-suppressed input audio signal generated by the noise suppressor having noise suppressed better than the expected level of noise suppression for which the speech encoder was designed, the speech encoder being configured to encode at least the processed noise-suppressed input audio signal into one or more data rate modes based at least in part on the speech-noise classification data, the speech-noise classification data adapting the speech encoder for the more than expected level of noise suppression.

2. The method of claim 1, wherein the speech encoder improves the quality of speech communications, based on the speech-noise classification data, by increasing an average data rate of encoded speech signals while keeping an average data rate of an encoded audio signal substantially constant.

3. The method of claim 1, wherein the classification is based on one or more acoustic cues.

4. The method of claim 1, further comprising providing one or more acoustic cues to the speech encoder, wherein the speech encoder is configured to select the one or more data rate modes based on the one or more acoustic cues.

5. The method of claim 4, wherein the acoustic cues comprise one or more characteristics selected from the group consisting of: a stationarity, a saliency, a transient detection, and a Voice Activity Detector (VAD) information.

6. The method of claim 1, wherein the speech-noise classification data is shared with the speech encoder via a memory.

7. The method of claim 1, wherein the speech-noise classification data is shared with the speech encoder via a Least Significant Bit (LSB) of a Pulse Code Modulation (PCM) stream.

8. The method of claim 1, further comprising providing by the noise suppressor one or more scaling transition factors to the speech encoder, wherein the speech encoder is configured to provide for gradual signal energy changes in transitions between one or more encoding modes based at least in part on the one or more scaling transition factors.

9. The method of claim 1, wherein the speech encoder improves a channel capacity and a system power consumption using the speech-noise classification data.

10. The method of claim 1, wherein the classifying is based on one or more of a stationarity, a direction, an inter microphone level difference (ILD), and an inter microphone time difference (ITD).

11. The method of claim 1, wherein the input audio signal comprises a first audio signal from a primary microphone and a second audio signal from a secondary microphone.

12. The method of claim 11, wherein the suppressing by the noise suppressor is based at least in part on an inter microphone level difference (ILD) between the first audio signal from the primary microphone and the second audio signal from the secondary microphone.

13. The method of claim 12, wherein the speech-noise classification data created by the noise suppressor is based at least in part on the inter microphone level difference (ILD).

14. The method of claim 1, wherein the speech encoder comprises a native noise suppressor different than the noise suppressor, the native noise suppressor providing the level of noise suppression for which the speech encoder was designed.

15. The method of claim 1, wherein adapting, using the speech-noise classification data, the speech encoder for the more than expected level of noise suppression includes bypassing the speech encoder's classification.

16. A method for improving quality of speech communications, the method comprising:

receiving, by a noise suppressor, an audio signal;

classifying, by the noise suppressor, the audio signal into speech, and speech and noise; and based on the classification, providing, by the noise suppressor, one or more scaling transition factors for use by a speech encoder, the speech encoder being configured to gradually change a data rate in transitions between one or more encoding modes based at least in part on the one or more scaling transition factors.

17. A system for improving quality of speech communications, the system comprising:

a communication module of a noise suppressor configured to receive an audio signal the noise suppressor configured to suppress noise in the audio signal to generate a processed noise-suppressed audio signal; and a classification module of the noise suppressor configured to classify the processed noise-suppressed audio signal into speech, and speech and noise, and determine speech-noise classification data based at least in part on the classifying, wherein the speech-noise classification data and processed noise-suppressed audio signal from the noise suppressor are received by a speech encoder, the processed noise-suppressed audio signal generated by the noise suppressor having noise suppressed better than the expected level of noise suppression for which the speech encoder was designed, the speech encoder being configured to encode the processed noise-suppressed audio signal into one or more data rate modes based at least in part on the speech-noise classification data, the speech-noise classification data adapting the speech encoder for the more than expected level of noise suppression.

18. The system of claim 17, wherein the speech encoder is configured to improve the quality of speech communications by increasing an average data rate of one or more encoded speech signals, based on the speech-noise classification data, while keeping an average data rate of an encoded audio signal substantially constant.

19. The system of claim 17, wherein the classification module classifies the audio signal based on one or more acoustic cues.

20. The system of claim 17, wherein the communication module further provides one or more acoustic cues to the speech encoder, wherein the speech encoder is configured to select the one or more data encoding modes based on the one or more acoustic cues.

21. The system of claim 17, wherein the noise suppressor and the speech encoder are both coupled to a memory, the memory storing the speech-noise classification data.

22. The system of claim 17, wherein the noise suppressor is configured to provide the speech-noise classification data to the speech encoder in a Least Significant Bit (LSB) of a Pulse Code Modulation (PCM) stream.

23. The system of claim 17, wherein the speech encoder comprises a native noise suppressor, the processed noise-suppressed audio signal having noise suppressed better than the expected level of noise suppression, provided by the native noise suppressor, for which the speech encoder was designed.

24. The system of claim 17, wherein the classifying is based on one or more of a stationarity, a direction, an inter microphone level difference (ILD), and an inter microphone time difference (ITD).

25. The system of claim 17, wherein the speech encoder is a variable bit rate speech encoder comprising a rate determining module.

26. The system of claim 17, wherein the communication module further shares one or more scaling transition factors with the speech encoder, wherein the speech encoder is configured to use the one or more scaling transition factors to gradually change data rate in transitions between one or more encoding modes.

27. A system for improving quality of speech communications, the system comprising:

a communication module of a noise suppressor configured to receive an audio signal; and a classification module of the noise suppressor configured to classify the audio signal into one or more speech, and speech and noise signals, and determine one or more scaling transition factors based on the classifying, wherein the noise suppressor is configured to provide the one or more scaling transition factors, the one or more scaling transition factors are received by a speech encoder, and the speech encoder is configured to gradually change a data rate in transitions between one or more encoding modes based at least in part on the one or more scaling transition factors.

28. The system of claim 17, wherein the speech-noise classification data is based on one or more of a stationarity, a direction, an inter microphone level difference (ILD), and an inter microphone time difference (ITD).

* * * * *